(12) United States Patent
Selwyn

(10) Patent No.: US 9,125,512 B2
(45) Date of Patent: Sep. 8, 2015

(54) HOLLOW-CAVITY, GAS-FILLED COOKWARE

(76) Inventor: Gary S. Selwyn, Santa Fe, NM (US)

( * ) Notice: Subject to any disclaimer, the term of this patent is extended or adjusted under 35 U.S.C. 154(b) by 702 days.

(21) Appl. No.: 13/433,054

(22) Filed: Mar. 28, 2012

(65) Prior Publication Data
US 2013/0255506 A1 Oct. 3, 2013

(51) Int. Cl.
A21B 3/13 (2006.01)
A47J 27/00 (2006.01)

(52) U.S. Cl.
CPC ........................ *A47J 27/002* (2013.01)

(58) Field of Classification Search
CPC ...................................... A47J 27/002
USPC ........... 99/339, 348, 422, 447, 324, 403, 483; 219/400, 385, 681; 29/602.1; 426/107, 426/109, 113, 114, 243; 126/21 A, 21 R, 126/390.1; 220/573.1, 912, 913
See application file for complete search history.

(56) References Cited

U.S. PATENT DOCUMENTS

| | | | | |
|---|---|---|---|---|
| 2,722,173 | A | * | 11/1955 | Dorr ............................. 249/168 |
| 4,265,968 | A |   | 5/1981 | Prewo |
| 4,431,892 | A | * | 2/1984 | White ........................... 219/623 |
| 4,541,411 | A |   | 9/1985 | Woolf |
| 5,422,459 | A |   | 6/1995 | Zhou |
| 5,513,558 | A |   | 5/1996 | Erickson |
| 5,643,485 | A | * | 7/1997 | Potter et al. .................. 219/621 |
| 6,092,520 | A | * | 7/2000 | Hasegawa ................. 126/390.1 |
| 6,109,504 | A |   | 8/2000 | Groll |
| 6,305,272 | B1 | * | 10/2001 | Lin ................................. 99/371 |
| 6,992,268 | B2 |   | 1/2006 | Kim |
| 7,926,418 | B2 |   | 4/2011 | Groll |
| 7,980,171 | B2 |   | 7/2011 | Groll |
| 2006/0272517 | A1 |   | 12/2006 | Groll |
| 2006/0283844 | A1 |   | 12/2006 | Cheng |
| 2008/0206437 | A1 |   | 8/2008 | Perry |
| 2008/0241582 | A1 |   | 10/2008 | Groll |
| 2009/0065499 | A1 | * | 3/2009 | England ........................ 219/621 |
| 2009/0152276 | A1 |   | 6/2009 | Groll |
| 2010/0163549 | A1 | * | 7/2010 | Gagas et al. .................. 219/622 |
| 2011/0041708 | A1 |   | 2/2011 | Groll |
| 2011/0162535 | A1 |   | 7/2011 | Groll |
| 2012/0067903 | A1 | * | 3/2012 | Chang ........................ 220/573.1 |
| 2012/0132642 | A1 | * | 5/2012 | Broders et al. ................ 219/488 |

FOREIGN PATENT DOCUMENTS

WO  WO2007105011  *  9/2007

* cited by examiner

*Primary Examiner* — Dana Ross
*Assistant Examiner* — Joseph Iskra
(74) *Attorney, Agent, or Firm* — Gary C Cohn PLLC

(57) ABSTRACT

A cooking vessel includes an upper element that defines a cook surface and a lower shell that defines a heat surface for contact with a heat source during heating. The upper element and the lower shell are joined together such that the cook surface and the heat surface are retained in a fixed spatial relationship with each other and a gas-filled cavity is defined between the heat surface of the lower shell and the cook surface of the upper element. An optional temperature sensor may be placed in contact with the gas for cooking temperature readout. Heat is transferred from the heat surface to the cook surface through the gas contained in the gas-filled cavity. Improved heat distribution is accomplished by static and dynamic means of enhancing gas convection. This promotes efficient and even heat distribution at low weight.

20 Claims, 13 Drawing Sheets

HOLLOW-CAVITY, GAS-FILLED COOKWARE

BACKGROUND OF THE INVENTION

The present invention relates generally to cookware for the home and commercial market, including cooking griddles, sauce pans, stock pots, woks and fry pans and, more particularly, to a form of composite cookware having a hollow, gas-filled cavity between the bottom heat surface and the top cook surface.

An important consumer concern for selection of home cookware is to provide uniform heating across the cooking surface. Heat sources such as gas or electric ranges generally provide non-uniform heating, so the cookware needs to correct this non-uniformity. Uniform heat distribution helps to avoid burning food and also helps eliminate undercooking. For this, the use of a metal vessel having a high thermal conductivity coefficient is helpful. Metals such as aluminum, copper and silver have a high thermal conductivity coefficient; however the use of aluminum or copper in contact with food is shunned by many consumers due to perceived potential health issues. The use of silver as a cooking surface is impractical because of its high cost and because it is prone to tarnishing. Stainless steel is the preferred metal to use with regard to taste, stain resistance and fewer perceived potential health issues; however it has poor thermal conductivity. That property makes the use of stainless steel cookery impractical for high performance cookware.

To meet the conflicting requirements of good thermal uniformity, stain resistance and health concerns, high performance cookery has been developed that uses a laminated construction consisting of multiple layers of metal. In these, embedded layers of aluminum, copper, or silver are sandwiched inside the cookware shell to aid in heat distribution. These embedded metal layers do not contact the food, but help to compensate for the poor heat distribution of stainless steel used for the cooking surface. For esthetic reasons, stainless steel may also be used on the heat surface of the cookware that is in contact with the heat source.

Examples of this laminate construction in the prior art is evidenced by U.S. Pat. No. 6,109,504, which describes the use of a thick, thermally conductive core of copper metal that is bonded to a cook surface of stainless steel. Similarly, U.S. Patent Application Publication US2008/0241582 describes the use of multi-ply cookware having layers of copper, silver and aluminum that are embedded between a top, cook surface of stainless steel and an esthetic, outer shell of stainless steel that is in contact with the heat source. As yet another example, is US Patent Application Publication US2006/0283844, which describes the use of laser welding to seal the rim of multi-layer cookware that comprises an inside sheet of copper for uniform heat distribution. That publication also teaches that is important to heat the cookware prior to brazing and sealing in order to help remove any trapped gases or moisture before this sealing is done.

These approaches improve upon the problem of uniform heat distribution for the cookware but also result in a new consumer concern: weight of the cookware. The use of multiple layers of metal in the cookware adds to the weight of the product. The result is that high performance cookware is often heavy. The weight of the product becomes a hindrance to its use, its storage and the ease with which the cookware can be cleaned. Heavy cookware is especially difficult for the elderly and many women to use. As an attempt to the reduce the weight of laminated, multi-layer cookware, US Patent Applications US2011/0041708 and US2009/0152276 describe the use of high conductivity, low density carbon foam used for heat distribution in place of heavy transition metal layers that are embedded into cookware. These patent applications also describe the use a vacuum pump to help promote direct contact (thermal conduction) between the carbon foam core and the upper and lower layers of stainless steel. In some cases, a vacuum pump is attached to the cookware during use. The use of a vacuum pump as part of a griddle having multi-layer metal construction is described in U.S. Patent Application US2011/0162535. The use of a permanently sealed, interior vacuum condition for multi-layer cookware has also been described in that publication.

U.S. Pat. No. 4,541,411 describes the use of a thermally anisotropic graphite layer used between metal layers for improved heat distribution in multi-ply cookware. The low density of the graphite core helps to reduce the weight of the cookware. Graphite is also good for heat distribution because it exhibits "anistropic" thermal conductivity: i.e., graphite has different values of thermal conductivity when measured along different crystalline axes. In the '411 patent, the thermal conductivity along the plane of the cookware's flat surface exceeds the thermal conductivity in the axis perpendicular to the flat surface, thereby helping to eliminate hot spots. Ordinary (and inexpensive) graphite has only limited such anisotropy because it is amorphous. Pyrolytic Graphite Sheet (PGS), is an exceptionally good choice for this purpose because its anisotropy is extremely high (>10×) and its thermal conduction in the flat plane is twice that of copper (which has only isotropic thermal conductivity characteristics). PGS is available in sheet thickness of about 0.1 mm. It is also heat resistant to about 500 C, which is ideal for cookware. The extremely high cost of PGS, however, makes its use for multilayer composite cookware prohibitively expensive. However, small pieces (such as static vanes in the present invention as described later) could be economically viable. Information on pyrolytic graphite sheet can be obtained at http://www.panasonic.com/industrial/components/pdf/pgs_info_0105.pdf Similarly, the use of graphite fibers for anisotropic heat conduction in cookware and glass vessels is described in U.S. Pat. No. 4,265,968. In this invention, shaped carbon fibers are incorporated into a glass matrix. Carbon nanotubes also provide anistropic thermal conductivity characteristics, as described by S. Berber et al., Phys. Rev. Lett, 84(20), pp 4613-4616, (2000), see http://www.pa.msu.edu/cmp/csc/eprint/DT130.pdf. Carbon nanotubes could be used for improved heat distribution in the present invention, once these become widely available.

U.S. Pat. No. 6,305,272 purports to describe the use of a "vacuum" container that envelopes the sides and bottom of a stock pot cooker. In this patent, an unidentified "action fluid" partially fills (to a volume level of 20%) the "vacuum space" to aid in heat transfer. However, the cooker of U.S. Pat. No. 6,305,272 is highly practical and dangerous if it can function at all as described. The "action fluid" is said to evaporate when heated, and that this evaporation leads to a "phase change heat transfer effect". However, the conversion of a liquid to gas leads to a massive volumetric expansion, which would cause very high pressures to develop in the "vacuum space". This leads to a very significant risk of explosion. In addition, the "phase change heat transfer effect" would not promote rapid heat transfer, but the opposite, as much of the applied heat would go into effecting the phase change rather than being transferred to the contents of the cooker. The device described in U.S. Pat. No. 6,305,272 only can be understood, if at all, by supposing that the "action fluid" is a low vapor pressure liquid with a high boiling point that does not in fact volatilize. Curiously, heating of the action fluid 14 in FIG. 4 of the '272 patent is accomplished by heat transfer through base body 12 in FIG. 4 of the '272 patent, which is a vacuum space that is not filled with any fluid. Heat transfer through any vacuum cavity would be expected to be very poor, so it is not clear how this device actually operates.

SUMMARY OF THE INVENTION

This invention is a cooking vessel comprising an upper shell that defines a cook surface and a lower shell that defines a bottom heat surface for contact with a heat source during heating, the upper shell and the lower shell being joined together such that the cook surface and the heat surface are retained in a fixed spatial relationship with each other and a gas-filled cavity is defined between the heat surface of the lower shell and the cook surface of the upper shell.

When the cooking vessel is used for cooking, the gas contained in the gas-filled cavity transfers heat from the heat surface to the cook surface. The upper and lower shells may be, for example, welded, brazed, screwed, riveted, or simply tightly connected. When placed on a heat source, such as a stovetop, heat is transferred from the heat surface through the gas in the gas-filled cavity to the cook surface, where the food is cooked or heated.

In certain embodiments, the cook surface is substantially planar. In other embodiments, the cookware has an inclined inner sidewall that at least partially surrounds the cook surface, and the lower shell defines an inclined outer sidewall that at least partially surrounds the heat surface, and the gas-filled cavity extends into a space defined by the upper and outer sidewalls. In such an embodiment the gas in the gas-filled cavity also transfers heat to the inner sidewall, and cooking can also be accomplished by contact with the inner sidewall of the cookware, in contrast to conventional cookware.

In some embodiments, a gas-tight seal is made between the upper and lower shells such that the gas in the gas-filled cavity is permanently trapped therein. A high thermal conductivity gas, such as helium, may be used to fill the gas-filled cavity when a gas-tight seal is made, as discussed in more detail below. Alternatively, the gas-filled cavity may be open to the atmosphere via one or more openings through which gas in the gas-filled cavity can exchange with atmospheric gases.

Various other embodiments include circulating means for circulating the gas within the cavity, as well as internal support means for structurally supporting the top and bottom halves of the cookware to reduce or prevent deformation of the cook and heat surfaces from pressurization during cooking or due to the weight of the contents in the cooking vessel.

The gas-filled cavity has isotropic thermal conductivity characteristics. However, by making the cavity gap between the cook surface and the heat surface sufficiently large, heat distribution results without "hot spots" that would otherwise occur in solid composition cookware having thin metal layers. Additionally, the convective properties of gas enable better mixing and thereby improved heat distribution.

The present invention solves the aforementioned problems of: 1) uniform heat distribution and 2) low product weight. Stainless steel is a suitable material of construction, particularly for the upper shell (including the cook surface) and so an attractive esthetic appearance essentially devoid of copper and aluminum is readily achievable. The present invention achieves these benefits by providing a gas-filled cavity located between the cook surface and the heat surface of the cookware. The gas-filled cavity helps to distribute heat uniformly. Because the gas-filled cavity adds negligible weight, the cookware has unusually low weight, but provides high performance and good thermal uniformity.

DETAILED DESCRIPTION OF THE INVENTION

Figure 1:
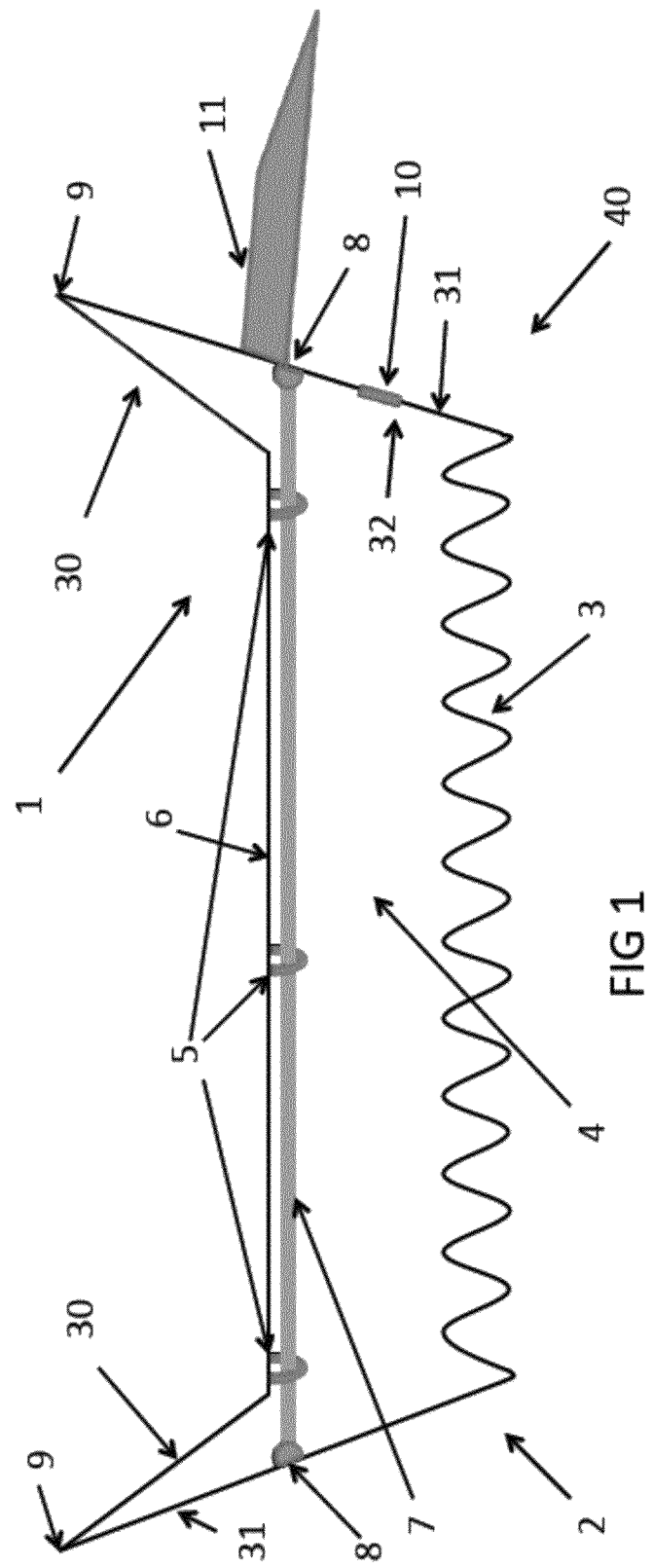
FIG. 1 is a cross-sectional view of one embodiment of the present invention, having a sealed gas-filled cavity.

Turning to FIG. 1, cooking vessel 40 includes upper shell 1 that includes cooking surface 6 and optional but preferred inclined inner sidewalls 30. In the embodiment shown, inclined inner sidewalls 30 completely surround optional but preferred substantially planar cooking surface 6. Lower shell 2 includes heat surface 3 and optional but preferred inclined outer sidewalls 31. Upper shell 1 and lower shell 2 are joined together such that cook surface 3 and heat surface 6 are retained in a fixed spatial relationship with respect each other, creating a hollow gas-filled cavity 4 between the upper shell 1 and lower shell 2. In the embodiment shown, upper shell 1 and lower shell 2 are bonded along top edge 9 where inclined inner sidewalls 30 and inclined outer sidewalls 31 meet. As shown, gas-filled cavity 4 extends into the space between inner sidewall 30 and outer sidewall 31.

The height of gas-filled cavity 4 (i.e. the vertical distance between the interior side of cook surface 6 and the interior side of heat surface 3) is exaggerated in FIG. 1 for purposes of illustration. Typically, this height is from 0.125 to 3 inches (about 3 to 75 mm) and more typically is from 0.25 to 1.5 inches (about 6 to 38 mm) and still more typically from 0.5 to 1 inch (about 12.2 to 25.4 mm).

The surface area of the exterior surface of the cook surface of the cooking vessel of the invention (which represents the available cooking surface area) can vary widely. The exterior surface area of the cook surface in some embodiments may be as small as about 28 in$^2$ (about 180 cm$^2$, corresponding to a circular pan about 6 inches (15 cm) in diameter) to 256 in$^2$ (about 1652 cm$^2$, corresponding to a square pan about 16 inches (about 41 cm) on a side). Larger or smaller cook surfaces 6 could be provided if desired. The weight advantages of this invention become increasingly significant as the size of the cooking vessel increases; therefore preferred cooking vessels of the invention include those in which the surface area of cook surface 6 is at least about 50 in$^2$ (about 323 cm$^2$), more preferably at least 75 in$^2$ (about 484 cm$^2$), up to about 256 in$^2$ (about 1652 cm$^2$).

Upper shell 1 and lower shell 2 can be joined in any way that creates a fixed spatial relationship between cook surface 6 and heat surface 3. By "fixed spatial relationship", it is meant simply that the cook surface 6 and heat surface 3 are held at a fixed and predetermined distance from each other that does not vary (apart from small fluctuations due to flexing that may occur due to changes in pressure within gas-filled hollow cavity 4 in response to temperature changes). In the embodiment shown in FIG. 1, this joining is achieved with a bond at top edge 9. This bonding may be achieved by, for example, welding, brazing, screwing, riveting, various types of mechanical locking devices or simply frictionally fitting upper shell 1 to lower shell 2. Various alternative and/or supplemental joining and/or supporting means can be employed. For example, support means may be located within the gas-filled cavity to maintain the cook surface and the heat surface at a fixed distance from each other, as described more fully below. In the embodiment shown in FIG. 1, a bar 7 and hooks 5 system represents such a supplemental support means.

Inner sidewalls 30 are optional, and can be omitted to form a flat cooking vessel (such as a griddle). In such a case, cook surface 6 of upper shell 1 can be bonded directly to inclined outer sidewalls 31, either along top edge 9 (forming a flat top surface without sidewalls) or at some lower point along the height of outer sidewalls 31. In such an embodiments, gas-filled cavity 4 would not extend to the sidewalls of the cooking vessel.

During use, cooking vessel 40 is placed with heat surface 3 directly on or above a heat source. The heat source may be, for example, an open flame (as in a gas range), an electrical resistance element or a magnetic induction element. Heat supplied to heat surface 3 is transferred to the gas contained in gas-filled cavity 4 and from the gas to cooking surface 6. In embodiments such as that shown in FIG. 1, the gas contained in gas-filled cavity 4 also transfers heat to inner sidewalls 30.

In the embodiment shown in FIG. 1, heat surface 3 of lower shell 2 is convoluted. The convolutions strengthen heat surface 3 and allow it to better contain pressure within gas-filled cavity 4 without significant deformation. The convolutions in heat surface 3 also increase the surface area of heat surface 3 for better heat absorption. The convolutions shown in FIG. 1 are optional and can be omitted. The convolutions of heat surface 3 may be, for example, parallel, concentric or spiral. A preferred convolution design is a parallel configuration in which the tops and bottoms of each convolution are uniformly separated from the adjoining convolutions. In FIG. 1, the heights of the convolutions are exaggerated for purposes of illustration. The convolutions may have a radius of curvature from 2 to 6 mm, although larger or smaller convolutions may be used.

Figure 3:
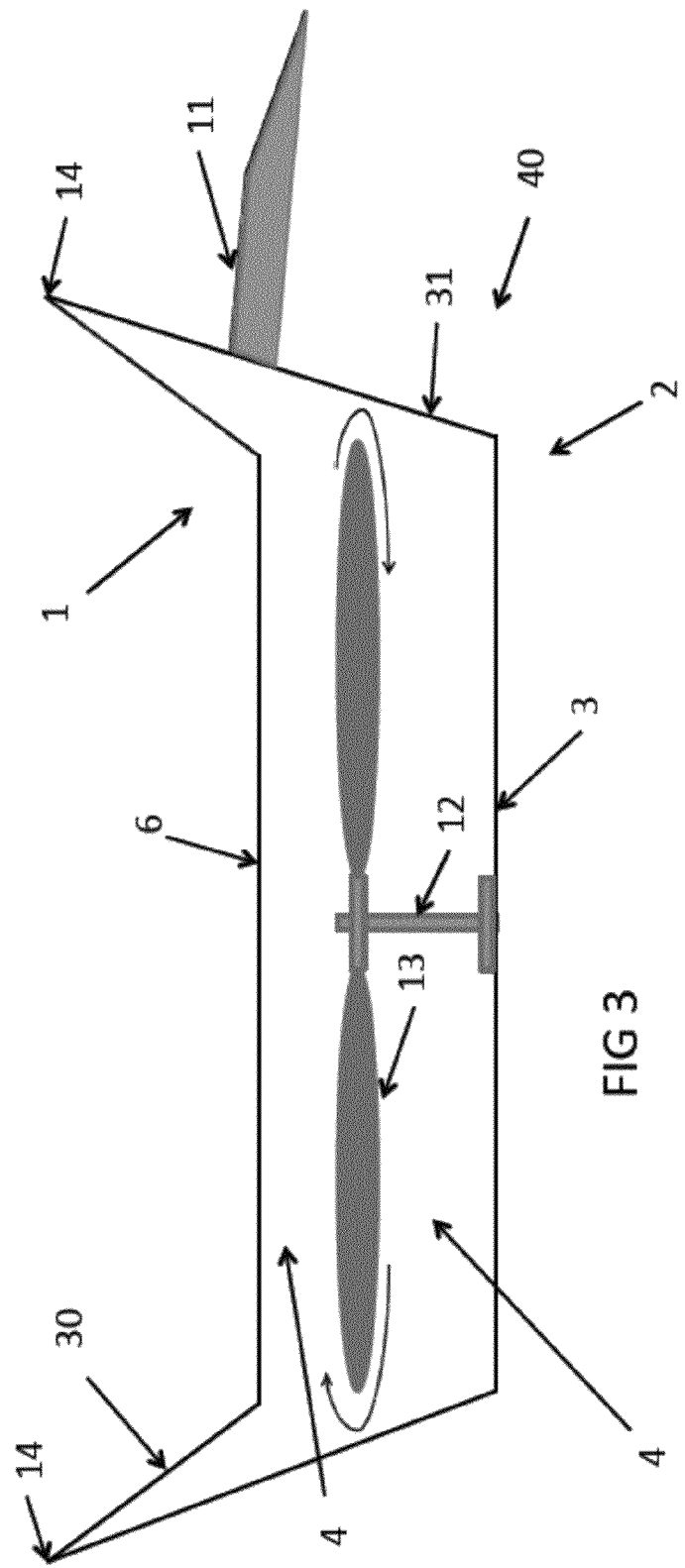
FIG. 3 is a cross-sectional view of another embodiment of the present invention, having an unsealed gas-filled cavity that can let gas enter or exit at the joining point of the upper and lower shells or through small vents and which has a gas mixing impeller mounted internally contained therein.

Heat surface 3 may be substantially planar (as shown in FIG. 3) so cooking vessel 40 will lay flat on a surface. If heat surface 3 is convoluted (as shown in FIG. 1), the lower part of each of the convolutions in heat surface 3 preferably sits on a plane (again as shown in FIG. 1) to form a flat bottom surface. Heat surface 3 may be non-convoluted. If non-convoluted, heat surface 3 may be supported or stiffened as described herein.

Upper shell 1 and lower shell 2 are preferably made of a material that conducts heat efficiently. Upper shell 1 and lower shell 2 each are preferably metal. Upper shell 1 and lower shell 2 may be made of the same or different materials. A preferred material of construction for upper shell 1 is stainless steel, such as 304L stainless steel. 304L is easy to weld, non-magnetic and is the preferred metal used in the food industry. Lower shell 2 may be made of, for example, copper, aluminum, stainless steel or a composite of two or more of these. 304L stainless steel is a useful material of construction for lower shell 2. For use with induction-type stovetops, lower shell 2 can be made of a magnetic-type stainless steel, such as type 303 stainless steel.

Upper shell 1 and lower shell 2 can be of any useful gauge, but thinner gauges consistent with needed mechanical strength are preferred for reasons of reducing weight. The thickness of upper shell 1 and lower shell 2 each may be varied independently from 0.01 to 0.1 inch (0.254 to 2.54 mm), approximately 32-12 gauge steel and 30 to 10 gauge aluminum or copper), preferably from 0.02 to 0.05 inch (0.51 to 1.27 mm, approximately 25-17 gauge for stainless steel and 24-16 gauge for aluminum and copper). An especially preferred stainless steel gauge for ease of fabrication and welding and for low weight considerations, is approximately 24 gauge stainless steel. 24 gauge stainless steel has a thickness of about 0.024, inch (0.607 mm) and it provides sufficient strength to help avoid deformation (except on long flat sections, such as the embodiment using a substantially planar cook surface 6 and the heat surface 3, if not convoluted) and can be laser or conventionally welded.

The embodiment shown in FIG. 1 includes an optional feature, i.e., support means located within the gas-filled cavity for the maintaining the cook surface and the heat surface at a fixed distance from each other. The fixed distance can be maintained, as shown in FIG. 1, by including stiffening means for stiffening cook surface 6 and thereby reducing its tendency to flex in response to changes in pressure in gas-filled cavity 4. Other suitable types of such support means include stiffening means situated within the gas-filled cavity for stiffening the heat surface, and various support members situated within the gas-filled cavity that connect cook surface 6 to the heat surface 3 and fix the distance between them.

Thus, in FIG. 1, cook surface 6 of upper shell 1 is stiffened on its underside by one or more support bars 7 held in place against cook surface 6 by hooks 5 that are attached (such as by welding or brazing) to the interior side of cook surface 6 of upper shell 1. Support bar(s) 7 minimize or avoid deformation of cook surface 6 due to the increase in cavity pressure during cooking and in that manner act to maintain the cook surface and the heat surface at a fixed distance from each other. Support bar(s) 7 alternatively can be tack welded or brazed to the bottom of cook surface 6, or can be integrally formed therewith. For a cooking vessel similar to a wok, in which cook surface 6 has a radius of curvature, it is not anticipated that the structural support provided by 5, and 7 would be needed.

Figure 6:
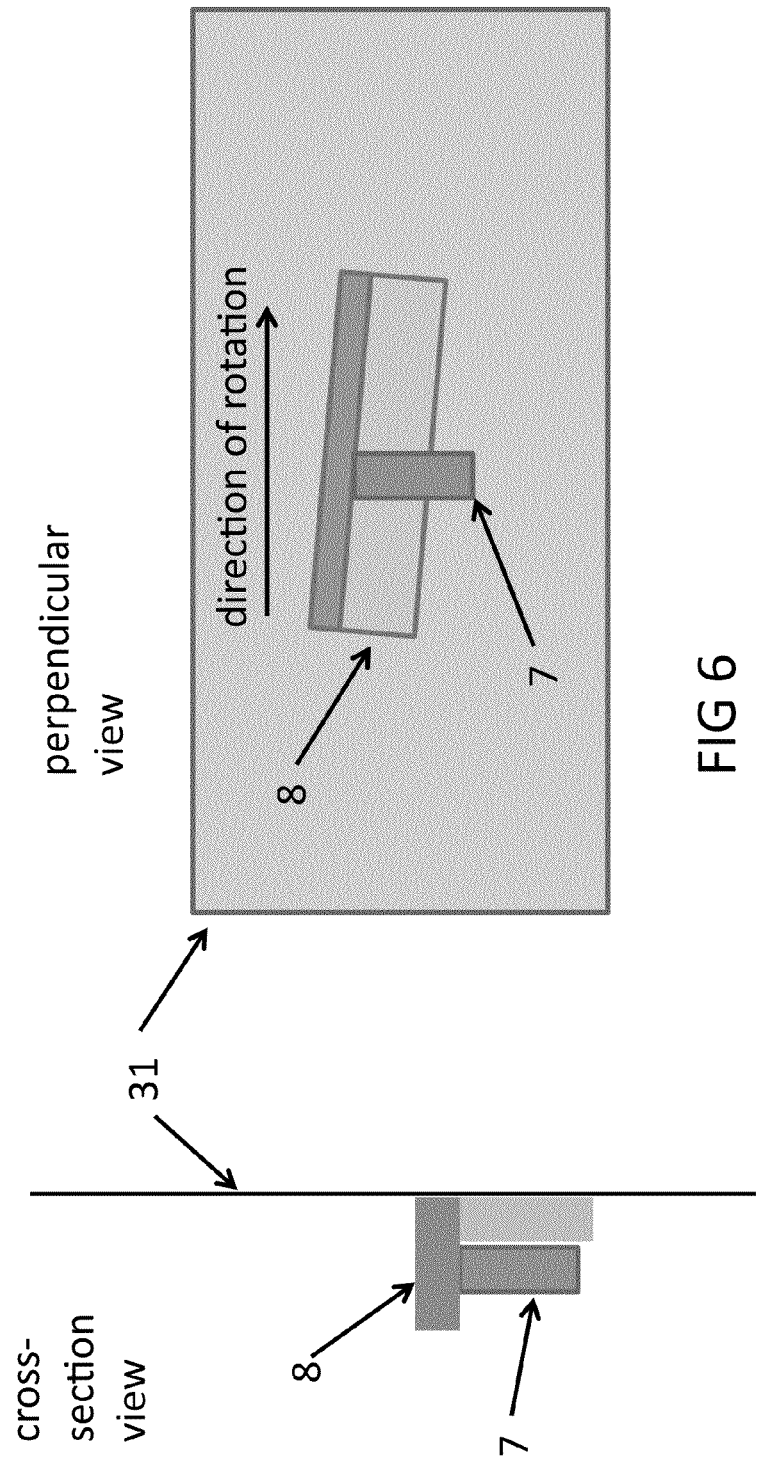
FIG. 6 is an enlarged cross-sectional view of a locking mechanism used to structurally support the cook surface of an embodiment of the present invention.

In the embodiment shown in FIG. 1, bar 7, which preferably is X-shaped, attaches to mounting brackets 8 that are attached (again, by methods such as welding or brazing) to the interior of outer sidewall 31 of lower shell 2. As shown in FIG. 6, bar 7 is secured in place via mounting brackets 8 by twisting upper shell 1 until the ends of bar 7 lock into position under mounting brackets 8. This locking mechanism also can temporarily hold upper shell 1 and lower shell 2 into position so that a seal can be formed along top edge 9 to seal gas-filled cavity 4. If support bar 7 is welded, brazed or integrally formed to cook surface 6, hooks 5 and mounting brackets 8 may be eliminated.

Similar approaches can be used to stiffen heat surface 3.

In the embodiment shown in FIG. 1, gas-filled cavity 4 is sealed to prevent the escape of the gas enclosed within the gas-filled hollow cavity. In the embodiment shown, this seal is along top edge 9, but the seal can be present at any other point of contact between the upper shell and lower shell. Upper shell 1 may be sealed with lower shell 2, for example, by welding, brazing, crimping or screwing the elements together, to make a gas-tight seal. If necessary, excess metal material may be machined away along or beyond top edge 9 after the seal is made. Alternatively or in addition, a high temperature sealant can also be used to seal the joint formed between the upper shell and the lower shell. One such high temperature metal sealant is "Hi-Temp Lab metal", available from Alvin Products, Everett Mass. (www.AlvinProducts.com).

Integrity of the seal may be checked by pressurizing the inner cavity and checking for leaks along the seal. Any gas can be used to test the integrity of the cookware; nitrogen or compressed air would inexpensive gases to use, however it is important that no significant amount of volatile liquid be permitted to enter the gas cavity in embodiments in which the gas-filled cavity is sealed, so that excessive pressures do not develop within the gas-filled cavity during cooking.

Embodiments in which the gas-filled cavity is sealed preferably include one or more ports 32 through which gas can be introduced. Such port(s) 32 preferably include seal 10 which seals the port and prevents the gas from leaking from the gas-filled cavity. The seal can be made of any material which withstands the pressures and temperatures to which it is exposed when cooking. An example of a suitable seal material is a high temperature silicone rubber available from McMaster-Carr that provides for a maximum working temperature of about 360° C. Seal 10 may be physically compressed to seal port 32 to prevent gas leakage. Seal 10 may be replaceable, and/or may be designed to allow the gas inside the gas-filled cavity to be replenished.

Seal 10 may be designed to fail if a predetermined pressure is exceeded within the gas-filled cavity, or if a predetermined temperature is exceeded, and in such cases can act as a pressure-release safety mechanism.

In embodiments such as shown in FIG. 1, in which the gas-filled cavity is sealed, the gas contained in the gas-filled cavity can be any material or mixture of materials that is a gas at 20° C., and preferably which is a gas at 0° C. and more preferably a gas a −40° C., in each case at one atmosphere pressure. The gas preferably is non-flammable. The gas may be, for example, air, nitrogen or oxygen, a noble gas such as neon, argon or helium, or a mixture of any two or more thereof. A preferred gas or gas mixture has a thermal conductivity of at least 50 mw/mK at 27° C. and a heat capacity of at least 1 kJ/Kg-° K. A more preferred gas or gas mixture has a thermal conductivity of at least 100 mw/mK at 27° C. and a heat capacity of at least 2 kJ/Kg-° K. Thermal conductivities and heat capacities of various candidate gases are as follows:

| Gas | Thermal Conductivity, mW/m-K | | Heat Capacity, kJ/kg-K |
|---|---|---|---|
| | 27° C. | 327° C. | |
| Helium | 156.7 | 252.5 | 3.12 |
| Air | 26.2 | 45.7 | 0.718 |
| Nitrogen | 26.0 | 44.0 | 0.743 |
| Oxygen | 26.3 | 48.1 | 0.659 |
| Argon | 17.9 | 30.6 | 0.312 |
| Neon | 49.8 | 78.7 | 0.618 |

Helium is a preferred gas when the gas-filled cavity is sealed, because of its outstanding thermal conductivity and high heat capacity and because it is inert. Note that the thermal conductivity of most gases increases with temperature and how helium compares to other common gases. The thermal conductivity of helium at 327° C. is more than 5 times greater than air. The heat capacity of helium (which helps with heat transfer to the cooking surface) is more than 4 times greater than air. Additionally, the low molecular weight of helium is believed to help to create faster convective "eddy" currents inside the cookware, which contributes to efficient heat transfer and heat distribution. The non-reactive nature of helium means that it will not react with or corrode materials, even at high temperature.

In embodiments in which the gas-filled cavity is sealed, the pressure (at 21° C.) of the gas in the gas cavity may be from 50 kPa to 300 kPa actual, with preferred pressures being from 80 kPa to 250 kPa and still more preferred pressures being from 100 kPa to 150 kPa actual. The gas used in embodiments in which the gas-filled cavity is sealed preferably is dry enough such that the dew point is no more than about −40° C., to prevent condensation of liquid in the cavity. It is highly preferred that substantially no liquids having a boiling temperature below about 300° C. be present inside a sealed gas-filled cavity, to avoid the large increases in pressure that can result from boiling such a liquid. During cooking, the pressures inside a sealed gas-filled cavity such as cavity 4 in FIG. 1 will increase to 2-3 times over the fill pressure at room temperature. The following table provides estimates of the increase in pressure within a sealed gas-filled cavity at different temperatures, using various room-temperature starting pressures. The last entry demonstrates the large increases in pressure that are seen if a liquid (in this case 20 volume-% water at room temperature) is present.

| Cavity Pressure as a Function of Temperature and Fill Pressure | | | | |
|---|---|---|---|---|
| | Temperature, ° C. | | | |
| | 21 | 205 | 315 | 482 |
| Cavity Pressure, psia (kPa) | 20 (138) | 32.4 (223) | 40 (276) | 51.4 (354) |
| | 40 (276) | 64.8 (447) | 80 (552) | 102.8 (709) |
| 20 Volume-% water | 20 (138) | 374 (2579) | 461 (3178) | 592 (4082) |

As can be seen from the data in the foregoing table, the presence of a volatile liquid in a sealed gas-filled cavity (as described in U.S. Pat. No. 6,305,272), leads to very large and potentially dangerous build-up of pressure within the cavity upon heating. However, the pressure increases calculated for dry gas are less than 5% of the tensile strength for 24 gauge stainless steel, and well less than the tensile strength of aluminum and copper of similar gauge. Accordingly, even in an extreme case involving a case temperature nearly 500° C. and a rather high (40 psia) starting pressure, the internal pressures are well less than the tensile strength of anticipated materials of construction, indicating safe operation.

Flat surfaces such as cook surface 6 and heat surface 3 in FIG. 1 (especially if not convoluted, or curved as in some embodiments) will in most cases be prone to deformation (bulging) at these pressures. For this reason, it is preferred, when the gas-filled cavity is sealed, to provide support means located within the gas-filled cavity for the maintaining the cook surface and the heat surface at a fixed distance from each other, i.e. to minimize or eliminate this bulging. As already mentioned, such support means may include, for example, various types of stiffening means for stiffening the cook surface, the heat surface, or both, as well as supports that bridge the gas-filled cavity, connecting the cook surface to the heat surface and fixing the distance between them.

Figure 5:
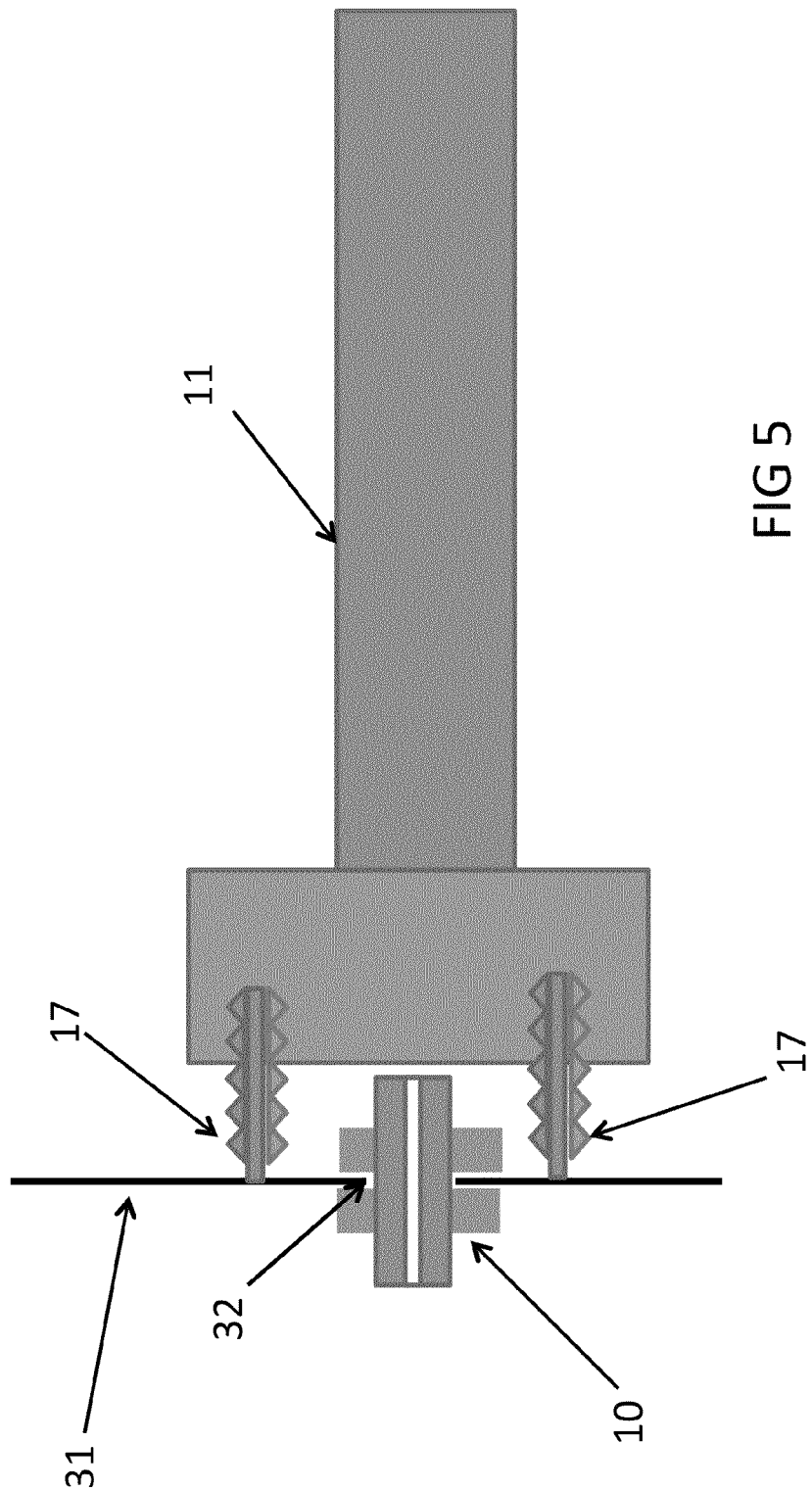
FIG. 5 is an enlarged cross-sectional view of an embodiment of a seal joint used to fill and then to confine gas inside the gas-filled cavity and the attachment of a handle to the cookware.

As shown in FIG. 1, the cooking vessel of the invention preferably includes one or more handles. Any number of different handles may be used without affecting the heat distribution provided by gas-filled, internal cavity. Handle placement helps with balancing and transporting the cookware. It can also provide aesthetic and functional use. In the embodiment shown in FIG. 1, handle 11 is mounted to outer sidewall 31 of lower shell 2. One method of attaching a handle is by the use of two threaded studs 17 that are welded or brazed to outer sidewall 31, as shown in FIG. 5. As an example of the functional and aesthetic use of a handle, in the embodiment shown in FIG. 5, handle 11 is mounted with a flat end against seal 10 in port 32 to provide pressure support for seal 10 and to hide seal 10. As shown in FIG. 5, a seal 10 may include protrusions that extend towards the inside of the gas-filled cavity and opposite that to the outside. When handle 11 is attached to outer sidewall 31 using welded threaded studs 17, handle 11 compresses seal 10 and thus more securely seals port 32 to keep it from being pushed out of port 32 by the increased gas pressure during heating. Similarly, increasing gas pressure in gas-filled cavity 4 during cooking also presses the inside portion of seal 10 against outer sidewall 31, helping to close the seal. Such a design helps to prevent gas leakage as the pressure within the gas-filled cavity increases during cooking.

In alternative embodiments, multiple handles can be present; the handle or handles can be affixed to either the upper shell, lower shell, or both; may be affixed directly to the cooking surface of the upper shell or the heat surface of the lower shell, and may be affixed using various attachment means including welding, brazing, riveting, screwing, various other mechanical fixtures and the like. A handle can be integrally formed with either the upper shell or lower shell. Some embodiments of the invention, such as a griddle, may have handles that are used only for carrying, or none at all.

Figure 2:
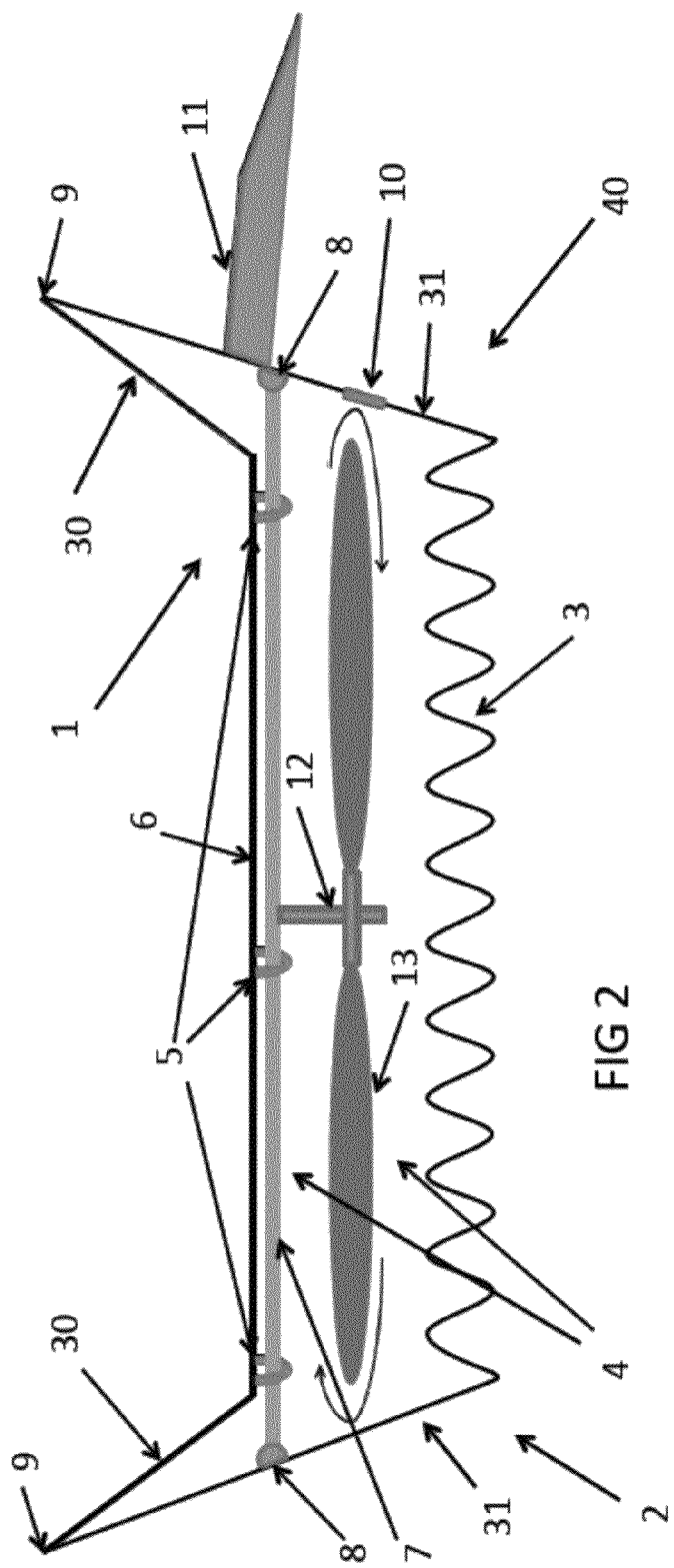
FIG. 2 is a cross-sectional view of another embodiment of the present invention, having a sealed gas-filled cavity with a gas mixing impeller located therein.

FIG. 2 depicts a cross section view of an alternate embodiment of the invention. Reference numerals 1, 2, 4, 6, 7, 8, 9, 11, 30, 31, 32 and 40 denote the same features as described with respect to FIG. 1. The embodiment shown in FIG. 2 further includes freely spinning gas impeller 13 that is mounted inside gas-filled cavity 4 on axle 12. During cooking, gas enclosed within gas-filled cavity 4 becomes heated and rises from heat surface 3. This rising gas causes gas impeller 13 to spin. This spinning promotes heat distribution across gas-filled cavity 4 and across cook surface 6. Alternatively, gas impeller 13 can be driven by a power source, such as an electrical or mechanical power source. The distribution of the gas through the operation of gas impeller 13 distributes heat more evenly throughout gas-filled cavity 4 and across cooking surface 6. The direction of spin will depend on the pitch of the blades, unless the gas impeller is driven by an external power source.

Any temperature-resistant material may be used to construct the gas impeller 13, but a high strength, low weight material is preferred. The gas impeller 13 may be made, for example, from machined carbon foam (as described in US 2009/0152276 and references therein), a high temperature carbon fiber, mica, aluminum, titanium or other stiff material, or a high temperature fiberglass or ceramic material. Such an impeller may contain 2 to 6 blades that span in the range of 40-90% of the internal diameter of the gas-filled cavity. A lightweight carbon fiber impeller with four blades can be purchased from Troybuilt Model Airplanes in Sarasota, Fla. or other model airplane hobbyist suppliers. The high temperature carbon foam material is commercially available from the Koppers Company under the registered trademark "KFOAM"®. Details on this material can be obtained at www.kfoam.com.

Axle 12 may instead be mounted on heat surface 3, or may extend across the entire distance between heat surface 3 and cook surface 6. In the latter case, axle 12 can be affixed to both heat surface 3 and cook surface 6 and thus form all or part of a support means for the maintaining the cook surface and the heat surface at a fixed distance from each other.

Figure 4:
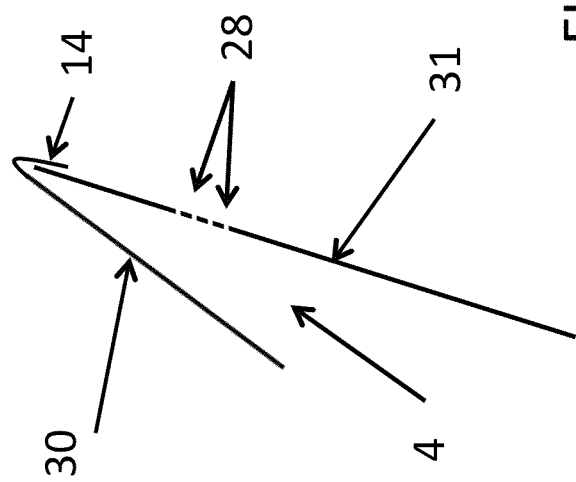
FIG. 4 is an enlarged cross-sectional view of the connection point between the top and bottom halves of the embodiment shown in FIG. 3.

FIG. 3 illustrates another embodiment of the invention, in which inner gas cavity 4 is not sealed. In FIG. 3, the features designated by reference numerals 1, 2, 3, 4, 6, 11, 12, 13, 30, 31 and 40 correspond to the similarly-identified features in FIGS. 1 and 2. In the FIG. 3 embodiment, upper shell 1 and lower shell 2 are held together simply by tight-fitting joint 14 (shown in more detail in FIG. 4), which may have one surface that overlaps the other surface, such as upper shell 1 creates a flap over lower shell 2, or the reverse. Joint 14 is designed to join together upper shell 1 and lower shell 2 such that the cook surface and the heat surface are retained in a fixed spatial relationship with each other, and also to allow gas to move in and out of gas-filled cavity 4 though joint 14. Tight fitting joint 14 allows the gas, which becomes slightly pressurized upon heating, to escape from gas-filled cavity 4. When the cookware cools after use, air will replace the partial vacuum created in gas-filled cavity 4 by the drop in temperature by moving back into gas-filled cavity 4 through joint 14.

Alternatively (or in addition), vent holes (such as holes 28 in FIG. 4) can be made in the inner sidewall 30 of upper shell 1, outer sidewall 31 of lower shell 2, and/or heat surface 3 to allow gas to enter or exit gas-filled cavity 4. Vent holes on cook surface 6 preferably are avoided, and it is preferred to avoid vent holes on heat surface 3 as well.

When the gas-filled cavity is not sealed, as is the case in the embodiment shown in FIG. 3, it would not make sense to use a gas such as helium, as this gas will be rapidly lost and will be soon replaced by air. Therefore, the gas in cavity 4 in such a case is typically air.

As there is no significant pressurization that results during the cooking process when the gas-filled cavity is not sealed (as in the embodiment represented in FIG. 3), there is less benefit in providing convolutions in heat surface 3 of outer shell 2. In general, internal support means for maintaining the cook and heat surfaces at a fixed distance from each other are less important when the gas-filled cavity is not pressurized, and may be omitted or reduced in number, for example, for purposes of reducing weight.

Figure 7:
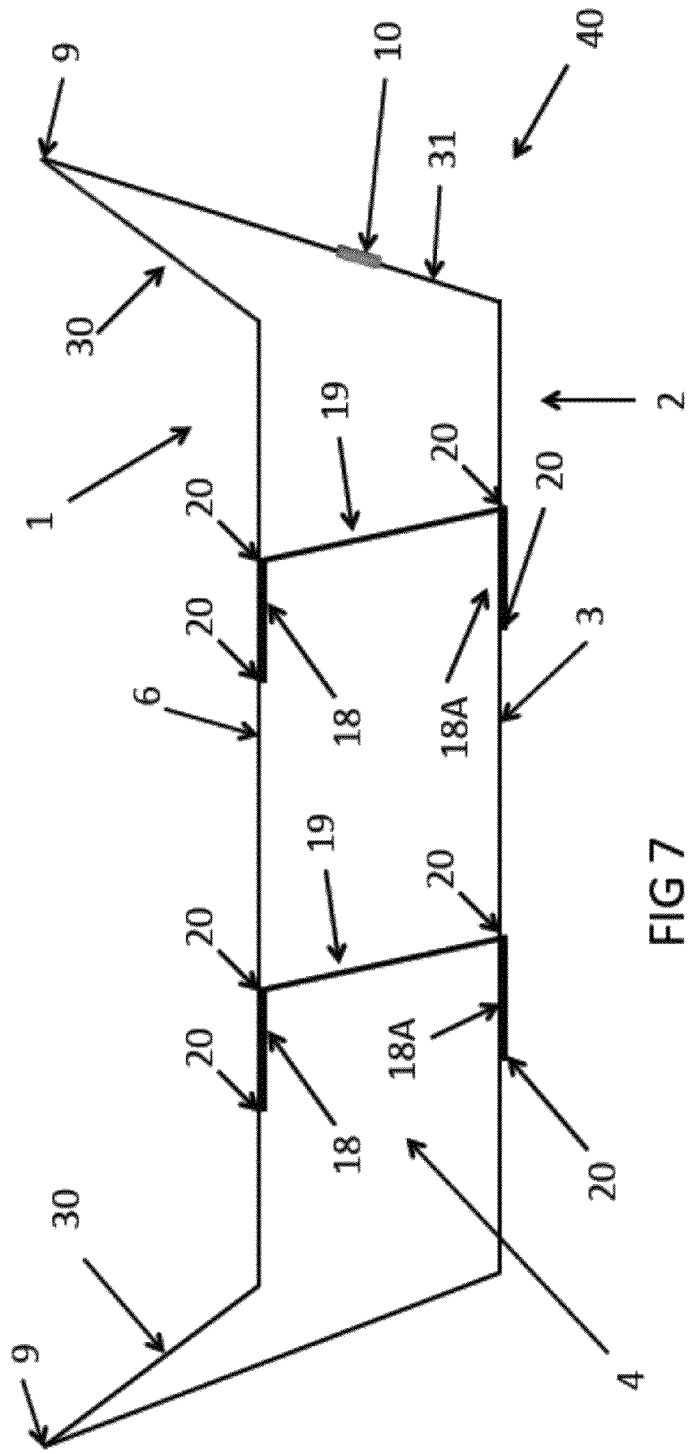
FIG. 7 is a cross-sectional view of an alternate embodiment of the present invention having internal supports between the cook surface and the heat surface.
Figure 11:
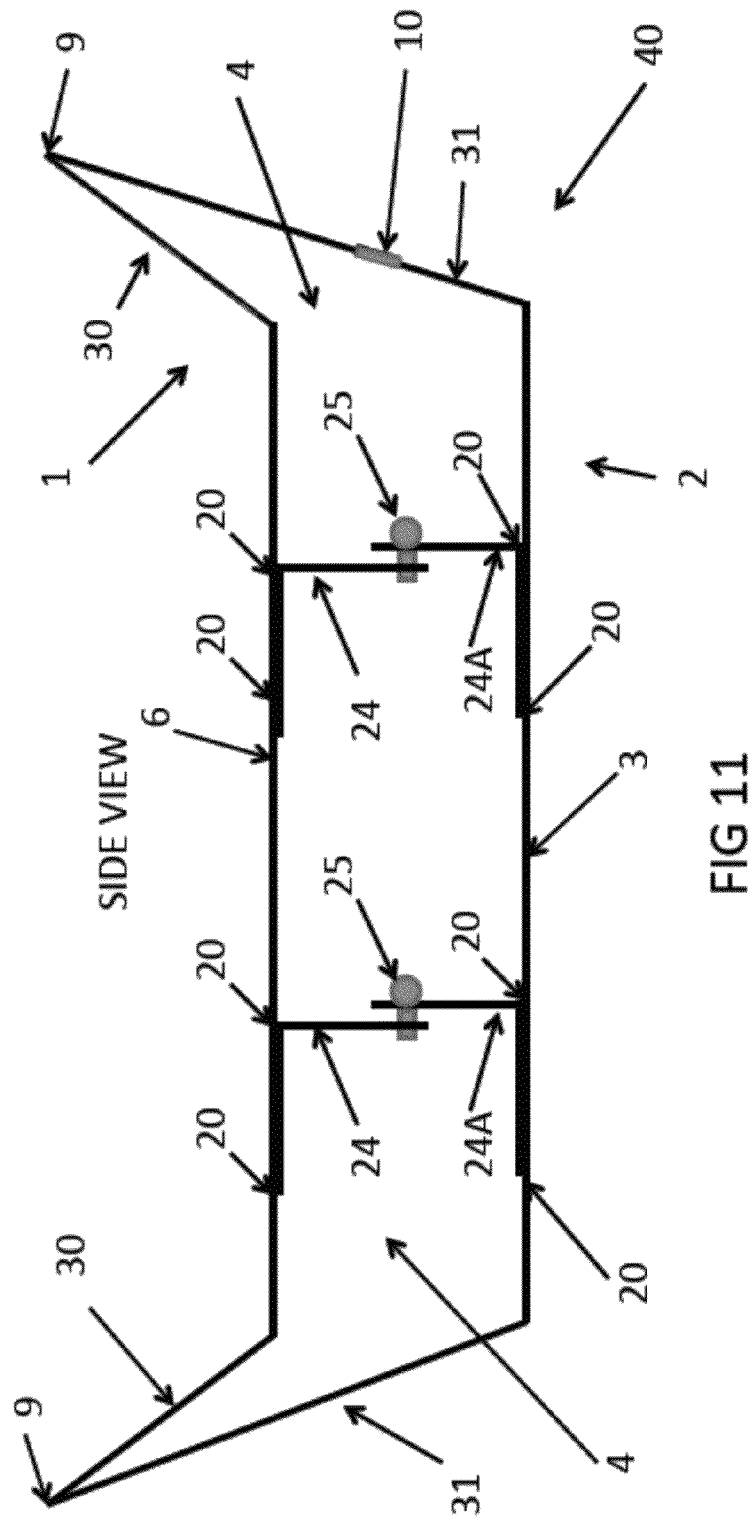
FIG. 11 is a cross-sectional view of an embodiment of the present invention, in which the two upper and lower shells lock into place using two welded supports having a pin and hole design.
Figure 13:
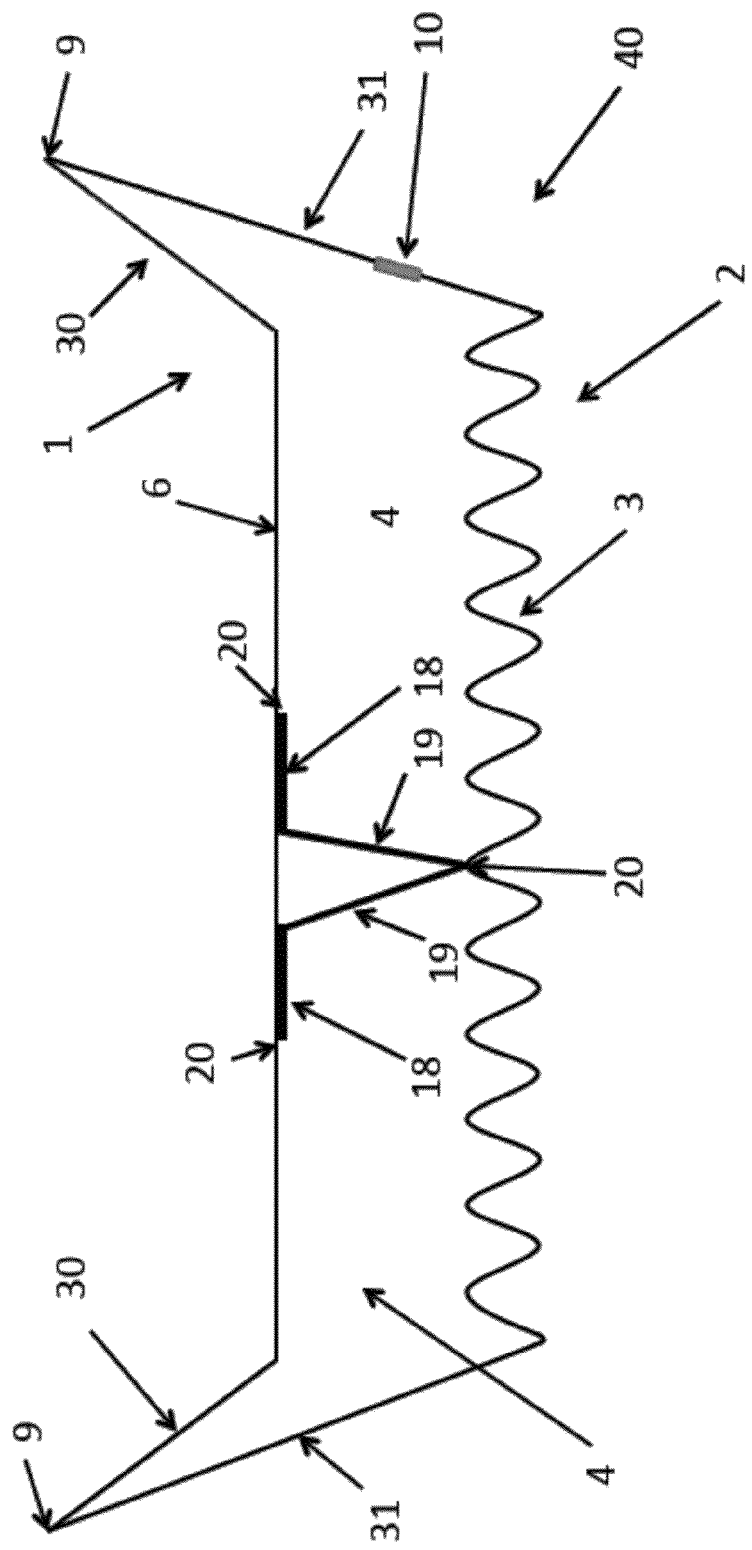
FIG. 13 is a cross-sectional view of an alternate embodiment of the invention that contains an internal structural support and a convoluted heat surface.

Various alternative designs can be used for the support means located within the gas-filled cavity for the maintaining the cook surface and the heat surface at a fixed distance from each other. Examples of such alternative designs are shown in FIGS. 7, 11 and 13. The features indicated by reference numerals 1, 2, 3, 4, 6, 9, 10, 30, 31, and 40 in FIGS. 7, 11 and 13 correspond to those in FIG. 1 that bear the same reference numerals.

In the embodiment shown in FIG. 7, heat surface 3 is non-convoluted. The support means in FIG. 7 takes the form of one or more support strips 19, which are attached (preferably by welding or brazing) to the interior side (facing the gas-filled cavity) of cook surface 6 and heat surface 3. The number of support strips used depends on the size of the cooking vessel. FIG. 7 shows two such support strips. Support strips 19 can be made of any rigid material that can withstand the temperatures encountered during cooking. Support strips 19 preferably are metal such as steel, aluminum or copper.

Support strips 19 can be fitted into slots that are cut into the interior sides of cook surface 6 and/or heat surface 3, and welded or brazed into such slots. In the embodiment shown in FIG. 7, such a slot extends all the way through heat surface 3. Further mechanical support for support strips 19 can optionally be provided in the form of flat tabs 18 and 18A. Flat tabs 18 and 18A can form part of a unitary "Z" or "L"-shaped support member that includes a support strip 19, or can be separate pieces which are separately affixed to the interior side of cook surface 6 or to the interior or exterior side of heat surface 3. Flat tabs 18 and 18A can be so affixed by welding or brazing, or by other suitable methods. A recess can be formed (by stamping or otherwise) in cook surface 6 and/or heat surface 3 to receive such a flat tab; this is especially important if a flat tab 18A is situated on an exterior surface of heat surface 3 (as shown in FIG. 7), so that bottom side of heat surface 3 remains flat. Points of welding or brazing 20 are indicated in FIG. 7. It is not necessary for flat tabs 18 and 18A to be completely welded to cook surface 6 or heat surface 3; spot welding or brazing is generally sufficient. If support strips 19 are separate pieces, they are welded or otherwise affixed to both the flat tabs 18 and 18A and the interior side of cook surface 6 and the interior or exterior side of side of heat surface 3. It is important that the welding be leak tight in cases in which a slot is formed through either cook surface 6 or heat surface 3 to receive a support strip 19 (if gas-filled cavity 4 is to be sealed).

In practice, flat tabs 18 and 18A are first attached in place. A slot is then cut into heat surface 3 to allow protrusion of support strip 19 through the slot. Support strips 19 are then affixed to flat tabs 18 on the interior side of cook surface 6 and are also optionally affixed directly to the interior or exterior side of cook surface 6. When upper shell 1 is joined and aligned with lower shell 2, support strips members 19 penetrate through the slots cut into heat surface 6. When aligned properly so that the upper and lower shells 1 and 2 form the desired cavity dimension between cook surface 6 and heat surface 3, and when both surfaces are parallel and flat, support strips 19 are then affixed to the flat tabs 18A and heat surface 3, such that the cavity is sealed and leak tight. Any excess material of support strips 19 is then machined off. In this way, support strips 19 prevent deformation of both flat surfaces as the cookware is pressurized from heating.

Figure 12:
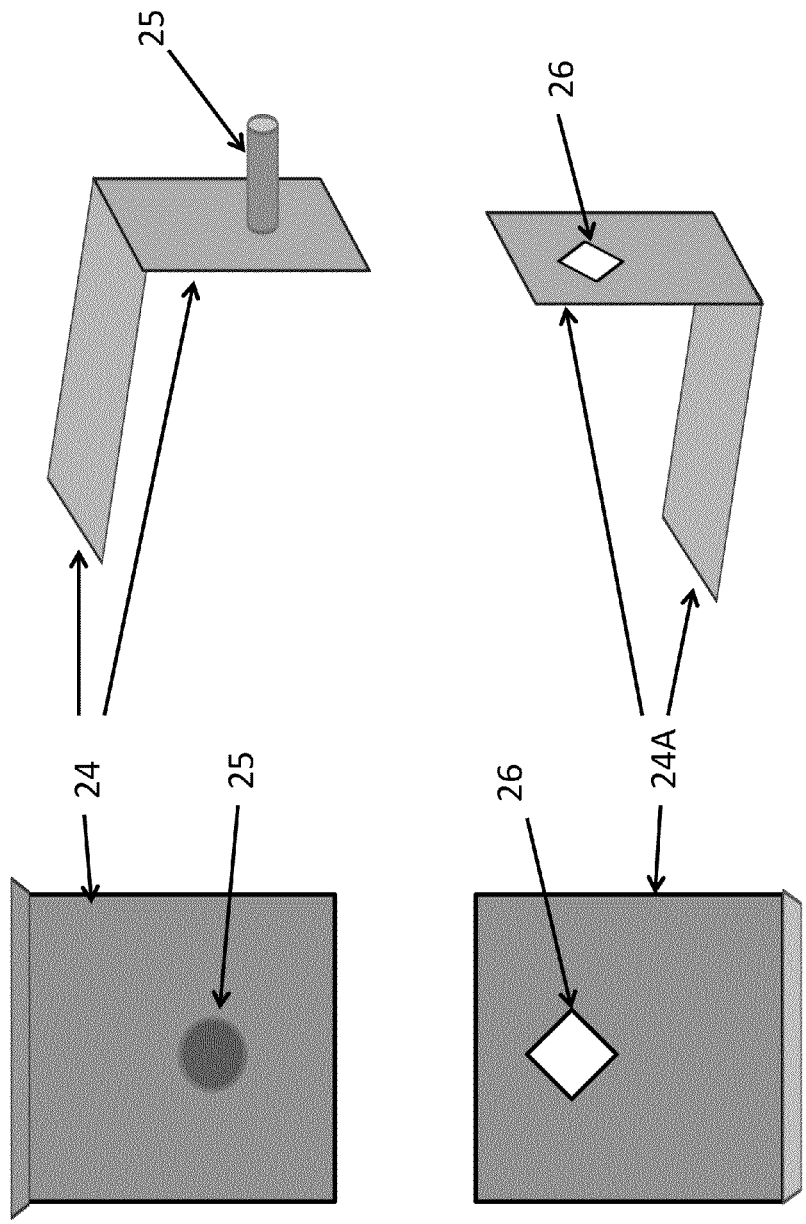
FIG. 12 includes enlarged front and isometric view of the structural supports of an embodiment of the invention such as shown in FIG. 11.

In the embodiment shown in FIGS. 11 and 12, the support means is an interlockable support that takes the form of two bent support members 24 and 24A, which are interlocked by pin 25. Bent support members 24 and 24A are affixed (such as through welds 20) to the interior side of cook surface 6 and to the interior side of heat surface 3, respectively. Support members 24 and 24A interlock to form a support. In the embodiment shown, bent support member 24 has pin 25 attached to it, while corresponding bent support member 24A has a hole 26 cut into it for receiving pin 25. Bent support members 24 and 24A interlock together to form the support means when pin 25 is inserted into hole 26. Of course, the pin and hole locking mechanism can be reversed the opposite way, and alternative interlocking mechanisms can be used in place of the hole-and-pin arrangement shown in FIGS. 11 and 12.

Whereas FIG. 11 and FIG. 12 show cylindrical and rectangular designs for the pin and the hole, respectively, any shape or design may be used to achieve the same purpose of interlocking the two components. For example, instead of a hole in support member 24a that receives pin 25 a slot may be cut into support member 24a to receive pin 25.

In the embodiment shown in FIG. 13 the support means takes the form of "V"-shaped structural support member 19. The upper parts of the "V" shape are attached (such as through welds 20) to flat tabs 18 (which may be integrally formed with V-shaped structural support member 19 or made as separate pieces) and to the interior side of cook surface 6. The pointed section of structural support member 19 is affixed to heat surface 3 by welding or brazing or otherwise. In the embodiment shown in FIG. 13, V-shaped structural support member 19 penetrates through a slot cut into heat surface 3. The part of structural support member 19 that penetrates through heat surface 3 is affixed (by welding, brazing or otherwise) to heat surface 3. This support embodiment may be used if heat surface 3 is convoluted (as shown in FIG. 13), or if heat surface 3 is non-convoluted. If gas-filled cavity 4 is to be sealed, the slot cut into heat surface 3 must have a leak-tight seal. In FIG. 13 the weld point is located at the top of the convolutions in heat surface 3 for aesthetic reasons, but this weld joint may be done anywhere on heat surface 3. Flat tabs 18 are not required for attaching structural support member 19 to a convoluted heat surface 3, because the convolutions maintain shape integrity during pressurization. In practice, it is expected that two or more structural support strips 19 would be required for cookware having more than a 10" (25.4 cm) diameter.

The embodiments shown in FIGS. 2 and 3 include one type of circulating means for circulating the gas within the gas-filled cavity. Other types of circulating means are useful. These can be generally characterized as dynamic types (which have one or moving parts such as the gas impellers 13 in FIGS. 2 and 3), and static types (which have no moving parts). Motion may be imparted to dynamic circulating means via some external or internal power source (such as an electrical motor or mechanical power source) or through the rising motion of heated gas within the gas-filled cavity.

Static devices include various types of static mixing vanes or other elements that direct the circulation of gas through the gas-filled cavity. The motive force typically comes from the localized reduction in gas density as gas is heated at the heat surface, which causes the locally heated gas to rise within the gas-filled cavity. Vanes direct the flow of the heated gas within the gas-filled cavity, distributing it more evenly throughout the cavity and more evenly across the interior side of the cook surface. These embodiments serve to improve heat uniformity on cook surface 6, while providing also maintaining the desired lightweight properties for the cooking vessel. The use the gas-filled cavity for heat transfer to the cooking surface helps to overcome the relatively poor heat distribution and resultant thermal non-uniformity provided by stainless steel as the preferred choice for material construction of the cooking vessel.

Figure 8:
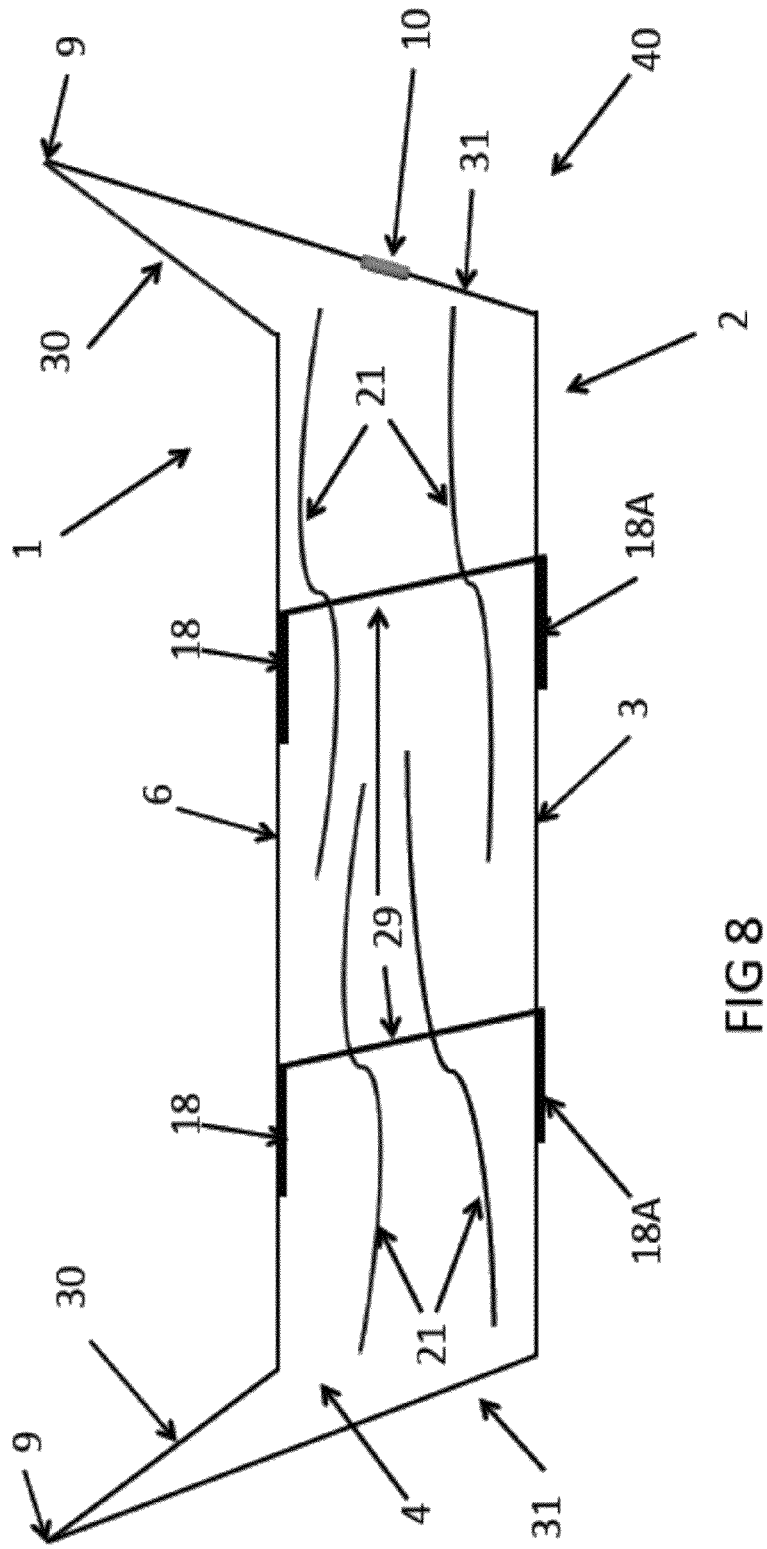
FIG. 8 is a cross-sectional view of an embodiment of the invention having static vanes mounted within the gas-filled cavity.
Figure 9:
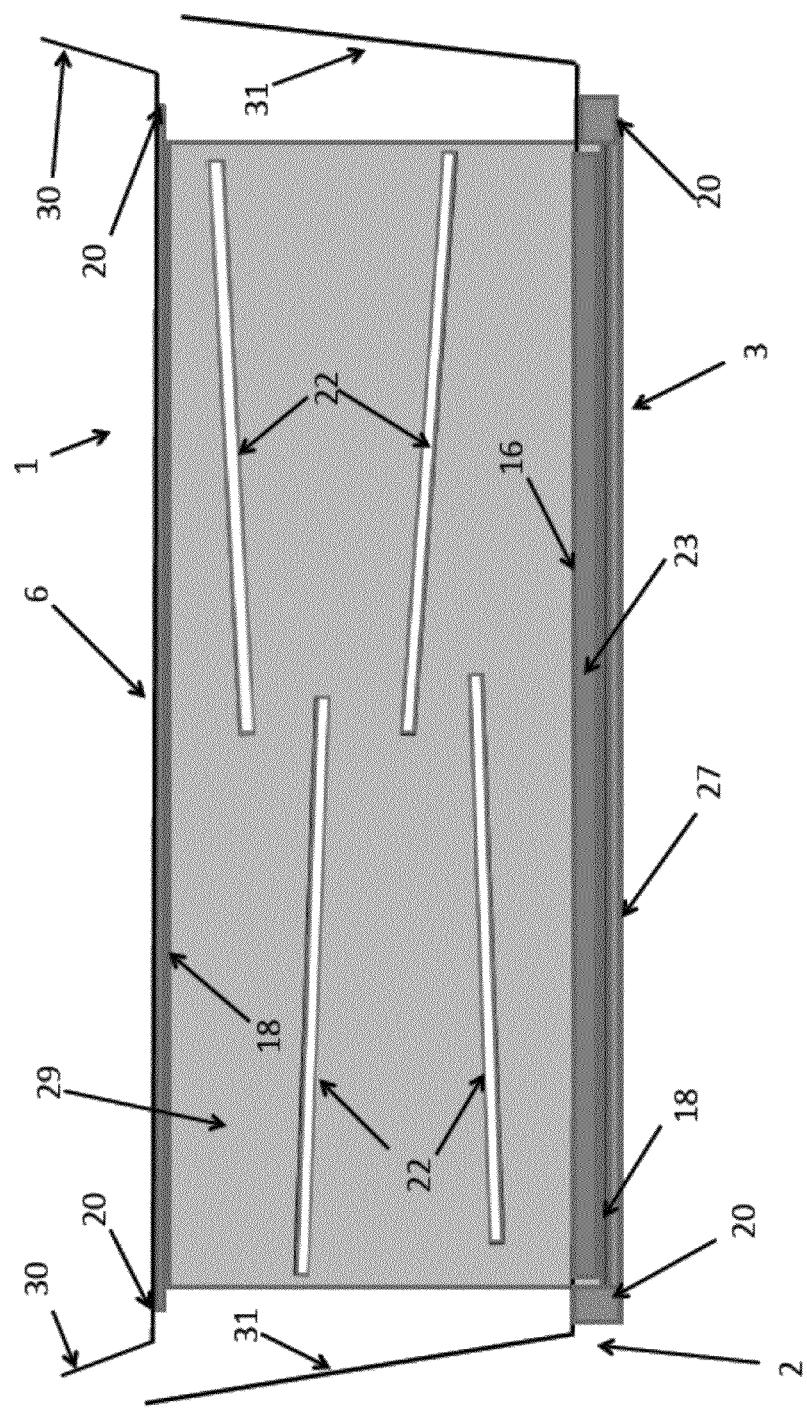
FIG. 9 is a rotated cross-sectional view of the embodiment of FIG. 8.

FIGS. 8 and 9 illustrate an embodiment of the invention in which vanes are present as a static means circulating or directing the gas flow inside gas-filled cavity 4. In FIGS. 8 and 9 reference numerals 1, 2, 3, 4, 6, 9, 10, 18, 18A, 30, 31, and 40 designate the same structures as discussed before. In the embodiments shown in FIGS. 8 and 9, static mixing vanes 21 are mounted on vane supports 29. Static mixing vanes 21 are thin strips of a heat-tolerant material. Static mixing vanes 21 may be made, for example, of a metal, especially a metal such as aluminum or copper that has a high thermal conductivity coefficient, or a thermally conductive non-metal, such as graphite, graphite sheet, pyrolytic graphite sheet, machined carbon foam, or a heat tolerant material that has embedded carbon nanotubes. Static mixing vanes 21 are shaped to create flow patterns to improve gas mixing for the heated, rising gas that is contained (whether sealed or not sealed) inside gas cavity 4. Static mixing vanes 21 improve heat distribution along cook surface 6 by enhancing the thermal mixing of the gas inside cavity 4 and also due to the heat distribution provided by the thermal conductivity of the vanes themselves. The use of graphitic vanes that also exhibit thermal conduction anisotropy means that the thermal mixing of the gas in the gas-filled cavity can be enhanced by aligning the high conduction value of the graphite vane parallel to, or close to parallel, to the cook surface 6. It would also be possible to create essentially two gas cavities in the space between the cook surface 6 and the heat surface 3 by mounting a vane that encompasses all or most of the diameter of the cooking vessel with a material such as graphite sheet or PGS, with the high thermal conduction value aligned parallel to the cook surface 3. In that case gas conduction would result both below the graphite sheet and above it, with the thermal conductivity of the graphite sheet adding to the improved thermal uniformity.

Vane supports 29 may also function as support means for maintaining the cook surface and the heat surface at a fixed distance from each other and may optionally be the same as support strips 19, as shown in FIGS. 7 and 13 or support strips 24 and 24A as shown in FIGS. 11 and 12.

FIG. 9 illustrates the design of a vane support 29 for the embodiment of FIG. 8. In FIG. 9, slots 22 cut into vane support 29 are shown. Static mixing vanes 21 are mounted into slots 22. Slots 22 may be angled (as shown) or may be parallel to cook surface 6, or a combination thereof, to promote gas mixing by deflection of the heated gas that strikes the static mixing vanes 21 upon rising from the heat surface 3.

Figure 10:
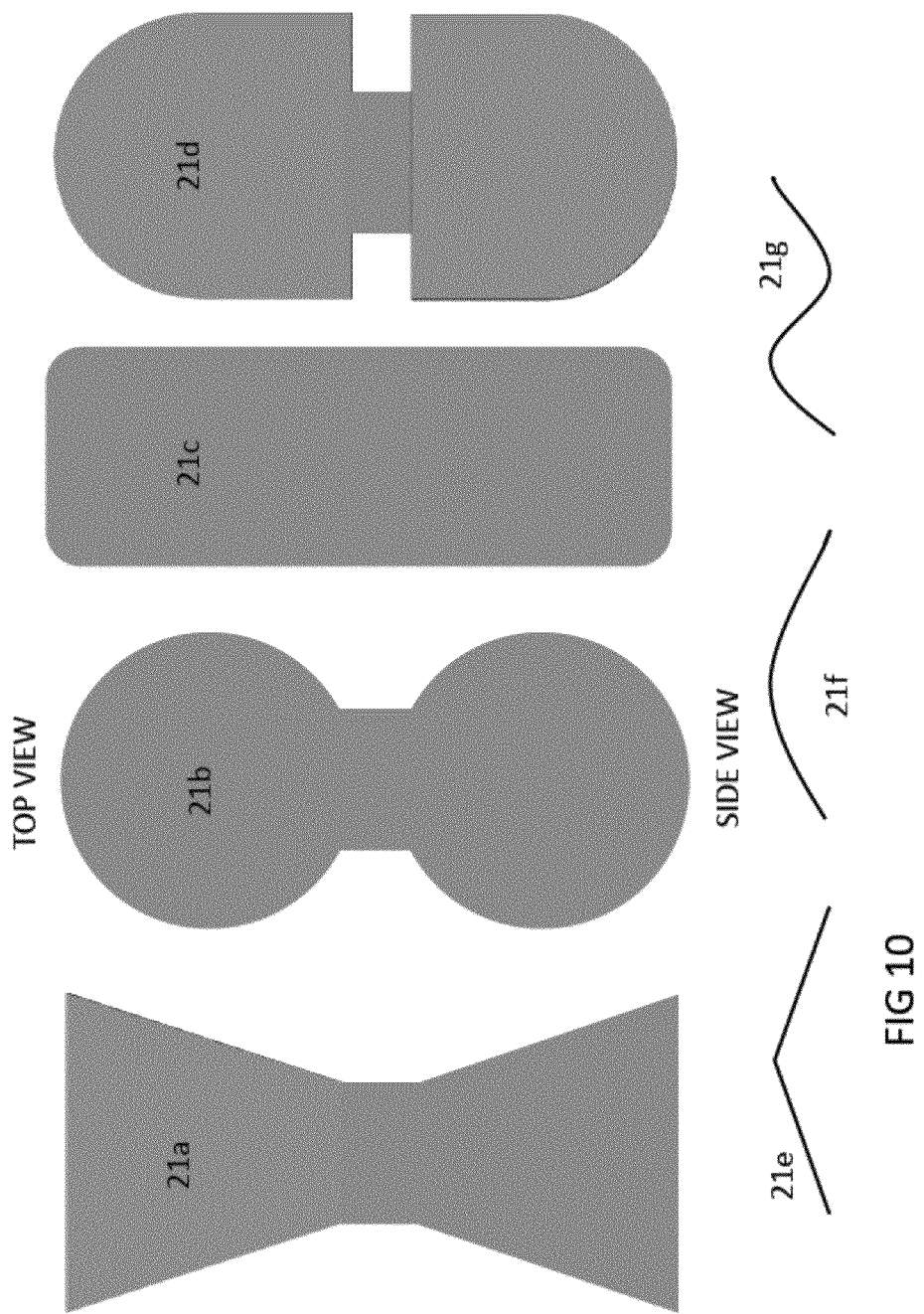
FIG. 10 is top and side view of various embodiments of static vanes for use in certain embodiments of the invention.

FIG. 10 illustrates various alternative designs for static mixing vanes. 21a-d show different top views for the vanes and 21e-g show different folded designs for the vanes. Each of the fold designs of 21e-g may be combined with any of the shape designs of 21a-d for the static vanes. In most cookware designs, 1 to 8, and preferably 2 to 4 vanes would be used as the preferred embodiment (as shown in FIG. 8 and FIG. 9). However, more or fewer may be used, depending on actual results and the size of the cookware.

The embodiment shown in FIG. 9 includes an additional optional feature, in which heat surface 3 is a composite of two or more metal layers. Such a composite may include, for examples, one or more layers of a highly thermally conductive material such as graphite, carbon nanotubes, pyrolytic graphite sheet (PGS), aluminum and/or copper, or other highly thermally conductive material, to promote even and rapid distribution of heat from the heat surface to the gas in the gas-filled cavity.

In the embodiment shown in FIG. 9, the composite heat surface 3 includes bottom plate 27, thermal conduction plate 23 and upper plate 16. Thermal conduction plate 23 is preferably comprised of a high heat conductivity material such as aluminum or copper, pyrolytic graphite sheet (PGS), graphite sheet or other high heat conductivity material. If PGS or graphite sheet is used, the direction of high thermal conductivity is aligned parallel to the heat surface 3. Thermal conduction plate 23 can have a thickness of, for example from 0.1 to 3 mm. In the embodiment shown in FIG. 9, thermal conduction plate 23 is positioned between upper plate 16 and a bottom plate 27. Upper plate 16 (which is optional and can be omitted) and second plate 27 each can have a lower thermal conductivity than thermal conduction plate 23, and preferably are each made of stainless steel. Unlike conventional designs, it is not necessary to vacuum bond the various layers of a composite heat surface 3 together, nor is it necessary that those layer be perfectly flat. With this invention, upper plate 16, thermal conduction plate 23 and second plate 27 constitutes heat surface 3. Vacuum bonding is not required, nor is perfect flatness required for thermal conduction plate 23, second plate 27 or for layer 16. Instead, any spaces between the various layers forming a composite heat surface 3 are filled with gas. Preferably, gas-filled cavity 4 is sealed and contains a high-conductivity gas as described before; this high-conductivity gas can fill any gaps as may exist between the various layers of a composite heat surface 3. Openings in upper plate 16 and/or thermal conduction plate 23 can allow the gas contained in gas-filled cavity 4 to enter into spaces between upper plate 16, thermal conduction plate 23 and second plate 27. Therefore, there is no need for metal bonding or vacuum bonding (as described in the prior art) to maintain thermal contact between the upper plate 16, thermal conduction plate 23 and second plate 27. No complex metallurgy is required as the composite structure is held in place by affixing second plate 27 to upper plate 16 to form heat surface 3. Instead, simple methods such as perimeter welding or brazing (such as welds 20) are sufficient to bond the various layers of a composite heat surface 3 together.

In the embodiment shown in FIG. 9, vane support 29 penetrates through both layer 16 and thermal conduction disc 23, which may have slots to receive vane supports 29. The gas used to fill cavity 4 also fills the space between the upper plate 16, conduction plate 23, and second plate 27, by passing through the slots in upper plate 16 and conduction plate 23, or by passing through vent holes intentionally created in upper plate 16 and conduction plate 23. The composite heat surface 3 is sealed by affixing bottom plate 27 to upper plate 16, thereby permanently embedding thermal conduction disc 23 between upper plate 16 and second plate 27, thereby containing the gas for thermal contact between upper plate 16, conduction plate 23 and bottom plate 27.

The approach as described for FIGS. 1, 2, 3, 7, 8, 9, 11 and 13 could also be applied to cookware of different aspect ratios, such as, for example, fry pans, omelet pans, brazing pans, sauce pans, griddles, woks and stock pots. This approach is also conducive to the design of very large cooking vessels, such as those 16" (41 cm) in dimension or larger. Fry pans this large would be extremely heavy if using laminated multiple layers of metal, as previously described, and the heat distribution would also be very poor, requiring a specially-designed stovetop. The gas convection and thermal conductivity enabled by the gas-filled cavity in the present invention, would promote good heat transfer to the cook surface.

By way of example, 10" (25.4 cm)-diameter circular helium-filled fry pan as illustrated in of FIG. 1 is constructed with a 25-mm separation between cook surface 6 and the top of convoluted heat surface 3. Upon heating to 650° F. (343° C.), the pressure-based deformation of cook surface 6 is about 4 mm. However, no gas loss is detected. The pan is about one-half of the weight of a comparable, high quality multi-layer fry pan and it heats up about twice as fast than the conventional, heavier fry pan, reaching frying temperature in about a minute. A surface thermocouple probe is used to record the cook surface temperature. The pan shows a temperature differential of about 20° F. (11° C.) at various points across cook surface 6 at a frying temperature of about 400° F.

(204° C.). By comparison, a standard carbon steel fry pan having an enamel outside coating and a non-stick coating on the cook surface, when operated in the same way, shows a temperature differential of about 70° F. (39° C.) across its cook surface. Both heat-up and cool-down are much faster for the helium-filled fry pan, meaning that less waiting time is required to reach proper cooking temperature and over-cooking can be better avoided. When the temperature of the fry pan is intentionally raised above 675° F. (357° C.), the seal 10 fails, releasing the captive and pressurized helium gas.

A cooking vessel of the invention may contain various optional features, such as, for example, scratch-resistant, or non-stick or non-stain, or diamond powder coatings on the cooking surface and on the sidewalls; attached covers or lids; built-in handles or grips; attached heating elements; and the like. The exterior and cooking surface of the cooking vessel may also be covered by enamel, ceramic, porcelain or paint without affecting the performance of gas-filled, hollow-cavity for heat distribution.

The cooking vessel may include a temperature sensor (such as a thermocouple) which is in contact with the gas contained within the gas-filled cavity and which measures the temperature thereof. Such a temperature sensor may communicate with a visual and/or aural indicator means, which indicator means provides a visual and/or sound signal indicative of the temperature of the gas in the gas-filled cavity. The indicator means may be, for example, a light or other display that indicates (for example, by turning on or off, by changing color or otherwise changing in appearance) when the gas in the gas-filled cavity has reached a pre-determined temperature. The indicator means may be or include a display, such as a gauge or digital display that indicates the temperature of the gas. The indicator means may be or include a device that produces a sound that indicates when the gas has reached a pre-determined temperature. The pre-determined temperature may be, for example, a particular cooking temperature, or a temperature indicative of an over-heating condition. Such an indicator means may be positioned on or in a handle or other portion of the cooking vessel.

The cooking vessel of the invention can be used in the same manner as conventional pans. The heat surface is brought directly or indirectly in contact with a heat source. Food or other material to be heated is introduced into the pan and brought into contact with the cook surface. Heat supplied to the heat surface heats the gas contained in the gas-filled cavity, which in turn heats the cook surface (and in some embodiments, the inner sidewall to the desired cooking temperature. A temperature sensor, when present, can be helpful to determine the precise or desired cooking temperature.

While specific embodiments of the invention have been described in detail, it will be appreciated by those skilled in the art that various modifications and alternative to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A cooking vessel comprising an upper element that defines a cook surface and a lower metal shell that defines a heat surface for contact with a heat source during heating, the upper element and the lower metal shell being joined together such that the cook surface and the heat surface are retained in a fixed spatial relationship with each other and a gas-filled hollow cavity is defined between the heat surface of the lower shell and the cook surface of the upper element and with no liquid content between the upper element and the lower metal shell, wherein the gas-filled hollow cavity is sealed to prevent the escape of the gas enclosed within the gas-filled hollow cavity, the gas in the gas-filled hollow cavity is a material or mixture of materials that is a gas at 0° C. and the gas pressure in the gas-filled hollow cavity is 50 to 300 kPa actual at 21° C.

2. The cooking vessel of claim 1, further comprising circulating means for circulating gas within the gas-filled hollow cavity.

3. The cooking vessel of claim 2, wherein the circulating means is a static circulating means positioned within the gas-filled hollow cavity.

4. The cooking vessel of claim 3, wherein the static circulating means includes one or more vanes.

5. The cooking vessel of claim 2, wherein the circulating means includes dynamic circulating means.

6. The cooking vessel of claim 5, wherein the dynamic circulating means includes one or more impellers.

7. The cooking vessel of claim 1 where the gas pressure in the gas-filled hollow cavity at room temperature is 100 to 150 kPa actual at 21° C.

8. The cooking vessel of claim 1, further comprising at least one port for transferring a gas into or out of the gas-filled hollow cavity, and seal means for closing the port or ports to seal a gas within the gas-filled cavity.

9. The cooking vessel of claim 8, further comprising a handle positioned against the seal means.

10. The cooking vessel of claim 1, wherein the gas in the gas-filled hollow cavity has a thermal conductivity of at least 100 mW/mK at 27° C. and a heat capacity of at least 2 kJ/Kg-° K.

11. The cooking vessel of claim 10, wherein the gas in the gas-filled hollow cavity includes helium.

12. The cooking vessel of claim 10, wherein the heat surface is a composite comprising two or more layers.

13. The cooking vessel of claim 12, wherein the composite contains one or more openings into the gas-filled hollow cavity, and a portion of the gas in the gas-filled hollow cavity fills spaces between the layers of the composite.

14. The cooking vessel of claim 12, wherein the composite contains carbon nanotubes, graphite sheet, pyrolytic graphite sheet or a metal.

15. The cooking vessel of claim 1 further comprising support means located within the gas-filled hollow cavity for the maintaining the cook surface and the heat surface at a fixed distance from each other.

16. The cooking vessel of claim 2 further comprising support means located within the gas-filled hollow cavity for mounting the means used for circulating or directing gas flow within the gas-filled hollow cavity.

17. The cooking vessel of claim 1 wherein the heat surface is convoluted.

18. The cooking vessel of claim 1 wherein the cook surface is stainless steel.

19. The cooking vessel of claim 1 further comprising a temperature sensor in contact with the gas inside the gas-filled hollow cavity.

20. The cooking vessel of claim 4, wherein the vane or vanes contain carbon nanotubes, graphite sheet, pyrolytic graphite sheet or a metal.

* * * * *